United States Patent Office 3,026,322
Patented Mar. 20, 1962

3,026,322
BIS-QUINALDINES
Richard U. Schock, Lake Forest, Ill., assignor to Abbott Laboratories, North Chicago, Ill., a corporation of Illinois
No Drawing. Filed July 14, 1958, Ser. No. 748,177
15 Claims. (Cl. 260—286)

This invention relates to new chemical compounds, particularly to a class of bis-quinaldines in which fusion takes place through the 4-amino group of the quinaldine nucleus to form the symmetrical structure. The invention also relates to methods for making such new compounds.

The chemicals to which this invention relates are bases and the non-toxic salts thereof in which the bases are characterized by the formula

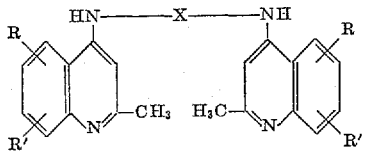

wherein X is an alkylene group having from 2 to 12 carbon atoms inclusive, phenyl, cyclohexyl or

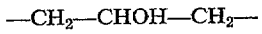

R is lower alkyl, hydroxyl, —N—$(CH_3)_2$,

—$NH_2$ or —$NHCOCH_3$ and R' is hydrogen or lower alkyl. The bases may be converted for use in the form of their non-toxic acid addition salts such as the hydrochloride, sulfate, p-aminobenzoate, stearte, citrate, lactate and the like. The quaternary ammonium salts of the above bases are also included among the non-toxic salts and are those in which quaternization occurs on a nuclear nitrogen atom in the quinaldine nucleus.

The quaternary ammonium salts corresponds to the formula

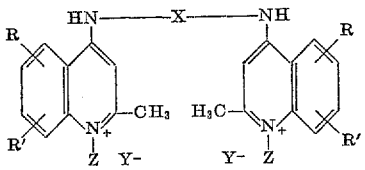

wherein X, R and R' are as previously identified in regard to the bases and wherein Z is a lower alkyl group and Y is an anion, for example, an anion derived from an inorganic acid, e.g., a halogen (as chlorine, bromine, fluorine, or iodine), sulfate, phosphate and the like; and an anion derived from a low molecular weight carboxylic acid such as propionate, benzoate and the like; an anion derived from a sulfate ester such as methylsulfate, or from a sulfonate such as p-toluenesulfonate. Quaternization is effected by heating the base with a quaternizing agent such as an alkylsulfate, lower alkyl halide or other agent which will give an anion as previously described.

The new bases and salts of this invention are active as trypanosides against such organisms as *T. gambiense, T. equiperdum, T. congolensi* and *T. cruzi*.

The compounds of this invention may be prepared by reacting a 4-methoxyquinaldine having substituents in the 5, 6, 7 or 8 positions with a diamino compound in the presence of phenol. The resulting basic reaction product is recrystallized from solvent and isolated by conventional methods. The acid addition salts of the above described crystalline bases are prepared by conventional methods such as warming the base with hydrochloric acid. The formation of quaternary salts from these bases has already been described, and in another method the substituted 4-methoxyquinaldine may be quaternized before reaction with the diamino compound to form the bis structure.

It will be apparent from the complete disclosure that any diamine falling within the scope of the claims may be reacted with any 4-methoxyquinaldine or 4-chloroquinaldine which is also substituted on the 5, 6, 7 or 8 position with a substituent of the type named in the preceding paragraphs, with the resulting formation of a bis compound as broadly defined in the structural formula. Polymethylene diamines such as hexamethylenediamine are somewhat preferred in this reaction.

The following examples are set forth in order to disclose the invention more fully but it should be understood that the examples are not intended to be a limitation on the invention in any way.

EXAMPLE 1

This example will illustrate in detail the method of making a base falling within the scope of this invention. It will be apparent that the same reaction can be employed in making a large number of bases and, without repeating the details of the reaction, reference will be made to a large and representative group of such bases that have been prepared.

*N,N'-bis-(6-Hydroxy-4-Quinaldyl)-1,6-Hexanediamine*

A mixture of 9.5 g. of 4-methoxy-6-hydroxy quinaldine (0.05 mole), 4.0 g. of 1,6-hexanediamine (0.025 mole) and 20 g. of phenol is heated to reflux under a short air condenser for about four hours. The resulting melt is poured into 250 ml. of acetone with stirring and chilling. The filtered crude base is recrystallized and the identity of the base is established by heating with 500 cc. of water and 250 cc. of concentrated hydrochloric acid. After chilling and filtering, the dihydrochloride of N,N'-bis-(6-hydroxy-4-quinaldyl)-1,6- hexanediamine is allowed to crystallize. The analysis calculated for $C_{26}H_{30}N_4O_2 \cdot 2HCl \cdot 3H_2O$ is C, 56.01; H, 6.87; N, 10.05. The analysis found is C, 56.35; H, 7.12; N, 10.26.

Other bases made by the same process are:
N,N' - bis-(5-hydroxy-8-methyl-4-quinaldyl)-1,6-hexanediamine.
N,N' - bis-(6-hydroxy-8-methyl-4-quinaldyl)-1,6-hexanediamine.
N,N' - bis(6-methyl-4-quinaldyl)-diaminopropanol-2.
N,N'-bis-(6-methyl-4-quinaldyl)-1,6-hexanediamine.
N,N' - bis - (6 - methyl - 4 - quinaldyl) - 1,4 - cyclohexanediamine.
N,N' - bis - (8 - methyl - 4 - quinaldyl)- 1,6 - hexanediamine.
N,N' - bis - (8 - methyl - 4 - quinaldyl) - ethylenediamine.
N,N' - bis - (8 - methyl - 4 - quinaldyl) - 1,5 - pentanediamine.
N,N' - bis - (8 - methyl - 4 - quinaldyl) - dodecamethylenediamine.
N,N' - bis - (8 - methyl - 4 - quinaldyl) - 1,8 - octanediamine.
N,N' - bis - (8 - methyl - 4 - quinaldyl) - p - phenylenediamine.
N,N' - bis - (8 - ethyl - 4 - quinaldyl) - 1,6 - hexanediamine.
N,N' - bis - (5,8 - dimethyl - 4 - quinaldyl) - 1,6 - hexanediamine.
N,N' - bis - (8 - hydroxy - 4 - quinaldyl) - 1,6 - hexanediamine.

N,N' - bis - (6,8 - dimethyl - 4 - quinaldyl - 1,6 - hexanediamine.

N,N' - bis - (5 - methyl - 8 - hydroxy - 4 - quinaldyl)-1,6 - hexanediamine.

N,N' - bis - (6 - methyl - 8 - hydroxy - 4 - quinaldyl)-1,6 - hexanediamine.

N,N' - bis - (7 - methyl - 8 - hydroxy - 4 - quinaldyl)-1,6 - hexanediamine.

N,N' - bis - (5,8 - dihydroxy - 4 - quinaldyl) - 1,6-hexanediamine.

N,N' - bis - (2 - methyl - 6 - amino - 4 - quinolyl) - 1,3-diaminopropane.

N,N' - bis - (2 - methyl - 6 - amino - 4 - quinolyl) - 1,3-diaminopropanol - 2.

N,N' - bis - (2 - methyl - 6 - amino - 4 - quinolyl) - octamethylenediamine.

N,N' - bis - (2 - methyl - 6 - amino - 4 - quinolyl) - p-phenylenediamine.

N,N' - bis - (2 - methyl - 6 - amino - 4 - quinolyl)-heptamethylenediamine.

N,N' - bis - (2 - methyl - 6 - amino - 4 - quinolyl)-hexamethylenediamine.

N,N' - bis - (2 - methyl - 6 - amino - 4 - quinolyl)-nonamethylenediamine.

N,N' - bis - (2 - methyl - 6 - amino - 4 - quinolyl) - decamethylenediamine.

N,N' - bis - (2 - methyl - 6 - amino - 4 - quinolyl) - undecamethylenediamine.

N,N' - bis - (2 - methyl - 6 - amino - 4 - quinolyl)-dodecamethylenediamine.

N,N' - bis - (2 - methyl - 6 - amino - 4 - quinolyl)-1 - methyl - 1,4 - butanediamine.

N,N' - bis - (2 - methyl - 6 - amino - 4 - quinolyl) - 1-methyl - 1,3 - propanediamine.

N,N' - bis - (2 - methyl - 6 - amino - 4 - quinolyl)-ethylenediamine.

N,N' - bis - (2 - methyl - 6 - amino - 4 - quinolyl)-1,4 - cyclohexanediamine.

N,N' - bis - (2 - methyl - 6 - nitro - 4 - quinolyl)-hexamethylenediamine.

N,N' - bis - (2 - methyl - 6 - dimethylamino - 4 - quinolyl) - hexamethylenediamine.

N,N' - bis - (2 - methyl - 6 - acetamido - 4 - quinolyl)-hexamethylenediamine.

EXAMPLE 11

*N,N'-Bis-(6-Hydroxy-4-Quinaldyl)-1,6-Hexanediamine Dihydrochloride*

5.0 grams of the base obtained in Example 1 is dissolved in 100 ml. of a 1:1 solution of hydrochloric acid and water. After chilling, the crude salt is filtered and recrystallized from dilute hydrochloric acid to obtain the pure N,N'-bis-(6-hydroxy-4-quinaldyl)-1,6-hexanediamine dihydrochloride. Analysis calculated for $$C_{26}H_{30}N_4O_2 \cdot 2HCl \cdot 3H_2O$$

is C, 56.01; H, 6.87; N, 10.05. Found: C, 56.35; H, 7.12; N, 10.26.

Acid addition salts of any of the bases listed above and falling within the scope of this invention are made by the same method detailed in Example 11. For example, the following acid addition salts are made:

N,N' - bis - (5 - hydroxy - 8 - methyl - 4 - quinaldyl)-1,6 - hexanediamine dihydrochloride dihydrate. Calculated: C, 59.25; H, 7.10; N, 9.87. Found: C, 58.69; H, 6.97; N, 9.65.

N,N' - bis - (6 - hydroxy - 8 - methyl - 4 - quinaldyl)-1,6 - hexanediamine dihydrochloride dihydrate. Calculated: C, 57.44; H, 7.18; N, 9.57. Found: C, 57.71; H, 7.22; N, 9.78.

N,N' - bis - (6 - methyl - 4 - quinaldyl) - 1,6 - hexanediamine dihydrochloride. Calculated: C, 67.32; H, 7.26; N, 11.22. Found: C, 67.37; H, 7.60; N, 11.25.

N,N' - bis - (8 - methyl - 4 - quinaldyl) - 1,6 - hexanediamine dihydrochloride. Calculated: C, 67.32; H, 7.26. Found: C, 67.31; H, 7.46.

N,N' - bis - (8 - methyl - 4 - quinaldyl) - 1,5 - pentanediamine dihydrochloride dihydrate. Calculated: C, 64.40; H, 7.21; N, 11.21. Found: C, 63.90; H, 7.36; N, 11.21.

N,N' - bis - (8 - methyl - 4 - quinaldyl) - 1,8 - octanediamine dihydrochloride dihydrate. Calculated: C, 63.43; H, 7.87; N, 9.94. Found: C, 65.08; H, 7.64; N, 9.44.

N,N' - bis - (8 - ethyl - 4 - quinaldyl) - 1,6 - hexanediamine dihydrochloride dihydrate. Calculated: C, 66.04; H, 7.76; N, 10.27. Found: C, 66.29; H, 7.41; N, 9.87.

N,N' - bis - (5,8 - dimethyl - 4 - quinaldyl) - 1,6 - hexanediamine dihydrochloride. Calculated: C, 68.28; H, 7.59; N, 10.03. Found: C, 68.25; H, 7.89; N, 10.91.

N,N'-bis-(8-hydroxy-4-quinaldyl)-1,6-hexane - diamine dihydrochloride trihydrate. Calculated: C, 56.01; H, 6.87; N, 10.05. Found: C, 56.10; H, 6.26; N, 10.08.

N,N'-bis-(6,8-dimethyl-4-quinaldyl) - 1,6 - hexane - diamine dihydrochloride trihydrate. Calculated: C, 61.95; H, 7.97; N, 9.63. Found: C, 62.08; H, 7.69; N, 10.25.

N,N'-bis-(5-methyl-8-hydroxy-4-quinaldyl) - 1,6 - hexanediamine dihydrochloride, 1½ H$_2$O. Calculated: C, 60.21; H, 7.04; N, 10.03. Found: C, 60.38; H, 6.52; N, 10.08.

N,N'-bis-(6-methyl-8-hydroxy-4-quinaldyl) - 1,6 - hexanediamine dihydrochloride dihydrate. Calculated: C, 59.25; H, 7.10; N, 9.87. Found: C, 58.67; H, 6.78; N, 9.84.

N,N'-bis-(7-methyl-8-hydroxy-4-quinaldyl) - 1,6 - hexanediamine dihydrochloride hydrate. Calculated: C, 61.20; H, 6.97; N, 10.20. Found: C, 61.20; H, 6.97; N, 10.01.

N,N'-bis-(5,8-dihydroxy-4-quinaldyl) - 1,6 - hexanediamine dihydrochloride.

N,N'-bis-(6-amino-4-quinaldyl) - 1,3 - diaminopropane tetrahydrochloride. Calculated: N, 15.79. Found: N, 15.61.

N,N'-bis-(6-amino-4-quinaldyl) - 1,3 - diaminopropane dihydrochloride tetrahydrate. Calculated: N, 15.82 Found N, 15.78.

N,N'-bis-(6-amino-4-quinaldyl)-1,3 - diaminopropanol-2 dihydrochloride tetrahydrate. Calculated: N, 15.35. Found N, 15.38.

N,N'-bis-(6-amino-4-quinaldyl) - octamethylenediamine dihydrochloride trihydrate. Calculated: N, 14.40. Found: N, 14.86.

N,N'-bis-(6-amino-4-quinaldyl) - phenylenediamine dihydrochloride dihydrate. Calculated: N, 15.90. Found: N, 16.0.

N,N'-bis-(6-amino - 4 - quinaldyl)-heptamethylenediamine dihydrochloride monohydrate. Calculated: N, 15.75. Found: N, 16.18.

N,N'-bis-(6-amino - 4 - quinaldyl) - hexamethylenediamine dihydrochloride dihydrate. Calculated: N, 15.64. Found: N, 15.64.

N,N'-bis-(6-amino - 4 - quinaldyl) - hexamethylenediamine di-isethionate. Calculated: N, 11.71. Found: N, 11.83.

In the same manner as set forth above in this example the following compounds are made:

N,N'-bis-(2-methyl-6-amino-4-quinolyl) - nonamethylenediamine. Analysis calculated for $$C_{29}H_{38}N_6 \cdot 2HCl \cdot 2H_2O$$

C, 60.09; H, 7.65; N, 14.50. Found: C, 59.80; H, 7.45; N, 14.52.

N,N'-bis-(2-methyl-6-amino - 4 - quinolyl)-decamethylenediamine. Analysis calculated for $$C_{30}H_{40}N_6 \cdot 2HCl \cdot 2H_2O$$

C, 61.50; H, 8.14; N, 13.48. Found: C, 60.99; H, 7.97; N, 14.34.

N,N'-bis-(2-methyl-6-amino-4-quinolyl) - undecamethylenediamine. Analysis calculated for $$C_{31}H_{42}N_6 \cdot 2HCl \cdot 2H_2O$$

C, 61.27; H, 7.96; N, 13.18. Found: C, 60.75; H, 7.78; N, 14.37.

N,N'-bis-(2-methyl-6-amino-4-quinolyl) - dodecamethylenediamine. Analysis calculated for $$C_{32}H_{44}N_6 \cdot 2HCl \cdot 2H_2O$$

C, 61.82; H, 8.11; N, 12.88. Found: C, 62.12; H, 8.17; N, 13.91.

N,N'-bis-(2-methyl-6-amino-4-quinolyl)-1-methyl - 1,4-butanediamine. Analysis calculated for $$C_{25}H_{30}N_6 \cdot 2HCl \cdot 2H_2O$$

C, 57.38; H, 6.94; N, 16.06. Found: C, 57.33; H, 6.94; N, 16.33.

N,N'-bis-(2-methyl-6-amino-4-quinolyl)-1-methyl - 1,3-propanediamine. Analysis calculated for $$C_{24}H_{28}N_6 \cdot 2HCl \cdot 3H_2O$$

C, 54.64; H, 6.88; N, 15.90. Found: C, 54.60; H, 6.53; N, 15.68.

N,N'-bis-(2-methyl-6-amino-4 - quinolyl) - ethylenediamine. Analysis calculated for $C_{22}H_{24}N_6 \cdot 2HCl \cdot 2H_2O$: C, 54.88; H, 6.28; N, 17.46. Found: C, 55.00; H, 5.91; N, 17.11.

N,N'-bis-(2-methyl-6-amino-4-quinolyl)-1,4 - cyclohexanediamine. Analysis calculated for $$C_{26}H_{30}N_6 \cdot 2HCl \cdot 2H_2O$$

C, 58.31; H, 6.78; N, 15.69. Found: C, 58.51; H, 6.55; N, 15.91.

EXAMPLE III

N,N'-Bis-(2-Methyl-6-Nitro-4-Quinolyl)-Hexamethylenediamine

A mixture of 4.4 g. of 4-chloro-6-nitroquinaldine (J. Chem. Soc., 1939, 563), 1.61 g. of hexamethylenediamine and 10 g. of phenol is heated as previously described. Precipitation from acetone yields 5.5 g. of crude product. Recrystallization from hot water yields 2.6 g. of the dihydrochloride trihydrate. Analysis calculated for $$C_{26}H_{28}N_6O_4 \cdot 2HCl \cdot 3H_2O$$

N, 13.87. Found: N, 13.84.

EXAMPLE IV

Methyl β-(p-Dimethylaminoanilino)Crotonate

A mixture of 132 g. of freshly distilled p-dimethylaminoaniline, 120 g. of methyl acetoacetate, 300 cc. of benzene and 8 drops of concentrated hydrochloric acid is boiled under a water separator until the theoretical amount of water has been collected. The benzene is then distilled and the oil dissolved in 300 cc. of warm Skelly B. Chilling produces 197 g. of methyl β-(p-dimethylaminoanilino)-crotonate, M.P. 82–83° C. Analysis calculated for $C_{13}H_{18}N_2O$: N, 11.96. Found: N, 12.03.

The above material is cyclized by adding it portionwise to 1000 cc. of refluxing Dowtherm A with stirring. The yield of 4-hydroxy-6-dimethylaminoquinaldine is 104.2 g., M.P. 303–305° C. A sample is recrystallized from dimethylformamide for analysis. Analysis calculated for $C_{12}H_{14}N_2O$: N, 13.85. Found: N, 13.92.

To 100 cc. of phosphorus oxychloride is added in one portion, 50 g. of 4-hydroxy-6-dimethylaminoquinaldine. The mixture becomes hot and solidifies. After cooling, 300 cc. of dry ether is added and the solid filtered. The salt is stirred with 1000 cc. of water and concentrated ammonium hydroxide is added until the color has changed from deep orange to yellow. The solid is then filtered, washed with water and recrystallized from dilute acetone. The yield of 4-chloro-6-dimethylaminoquinaldine is 48.5 g., M.P. 92–93° C. Analysis calculated for $C_{12}H_{13}N_2Cl$: N, 12.70. Found: N, 1301.

EXAMPLE V

N,N'-Bis-(6-Dimethylamino-4-Quinaldyl)-Hexamethylenediamine

A mixture of 3.45 g. of 4-chloro-6-dimethylaminoquinaldine, 1.26 g. of hexamethylenediamine and 10 g. of phenol is heated under reflux conditions as in Example 1. The product is separated as before by dilution with acetone. Recrystallization from hot water affords 2.6 g. of the above-named product. Analysis calculated for $$C_{30}H_{40}N_6 \cdot 2HCl \cdot 2H_2O:$$

C, 60.69; H, 7.81; N, 14.16. Found: C, 59.67; H, 7.57; N, 14.23.

In like manner the following 6-dimethylamino derivatives were prepared:

N,N' - bis - (6 - dimethylamino - 4 - quinaldyl) - octamethylenediamine. Analysis calculated for $$C_{32}H_{44}N_6 \cdot 2HCl:$$

C, 65.62; H, 7.92; N, 14.35. Found: C, 65.74; H, 7.70; N, 14.27.

N,N' - bis - (6 - dimethylamino - 4 - quinaldyl) - nonamethylenediamine.

N,N' - bis - (6-dimethylamino - 4 - quinaldyl) - decamethylenediamine.

N,N' - bis - (6 - dimethylamino - 4 - quinaldyl) - heptamethylenediamine.

N,N' - bis - (6 - dimethylamino - 4 - quinaldyl) - 1,4-butanediamine.

N,N' - bis - (6 - dimethylamino - 4 - quinaldyl) - 1-methyl-1,4-butanediamine.

N,N' - bis - (6 - dimethylamino - 4 - quinaldyl) - 1-methyl-1,3-propanediamine.

N,N' - bis - (6 - dimethylamino - 4 - quinaldyl) - 1,4-cyclohexanediamine.

N,N' - bis - (6 - dimethylamino - 4 - quinaldyl) - p-phenylenediamine.

N,N' - bis - (6 - dimethylamino - 4 - quinaldyl) - diaminopropanol-2.

EXAMPLE VI

4-Chloro-6-Dimethylamino-1,2-Dimethyl Quinolinium Iodide

A solution of 2.00 g. of 4-chloro-6-dimethylaminoquinaldine is allowed to stand in 7 cc. of methyl iodide for 24 hours. The orange solid which has separated is filtered and washed with acetone yielding 2.42 g. of the above-named product. A sample is recrystallized from methanol, M.P. 253–255° C. The nuclear nitrogen is found to be quaternized in the formation of 4-chloro-6-dimethylamino-1,2-dimethyl quinolinium iodide. Analysis calculated for $C_{13}H_{16}N_2ClI$: N, 7.73. Found: N, 7.64.

EXAMPLE VII

N,N'-Bis-(6-Dimethylamino-4-Quinaldyl)-Hexamethylenediamine-1,1'-Bis-Methiodide A mixture of 3.6 g. of 4-chloro-6-dimethylamino-1,2-dimethyl quinolinium iodide, 0.82 g. of hexamethylenediamine and 10 g. of phenol is heated and the product is isolated by dilution with acetone. The above-named bis product is twice recrystallized from water. The yield is 0.68 g., M.P. 178–190° C. to a glass. Analysis calculated for $C_{32}H_{46}N_6I_2 \cdot 2H_2O$: C, 47.76; N, 6.26; N, 10.45. Found: C, 47.67; H, 5.99; N, 11.51.

Other compounds of this series may be made using any suitable diamine of the type described herein, such as diaminopropane, which results in the compound N,N'-bis-(6 - dimethylamino - 4 - quinaldyl) - 1,3 - diaminopropane-1,1'-bis-methiodide. Analysis calculated for $$C_{29}H_{40}N_6I_2 \cdot 2H_2O:$$

C, 45.68; H, 5.82; N, 11.02. Found: C, 46.41; H, 5.80; N, 11.68.

In like manner the 1,1'-bis-methiodide quaternary salts of the following tertiary bases are obtained:

N,N' - bis - (6 - dimethylamino - 4 - quinaldyl) - octamethylenediamine.

N,N' - bis - (6 - dimethylamino - 4 - quinaldyl) - nonamethylenediamine.

N,N' - bis - (6 - dimethylamino - 4 - quinaldyl) - decamethylenediamine.

N,N' - bis - (6 - dimethylamino - 4 - quinaldyl) - heptamethylenediamine.

N,N' - bis - (6 - dimethylamino - 4 - quinaldyl) - 1,4-butanediamine.

N,N' - bis - (6 - dimethylamino - 4 - quinaldyl) - 1-methyl-1,4-butanediamine.

N,N' - bis - (6 - dimethylamino - 4 - quinaldyl) - 1-methyl-1,3-propanediamine.

N,N' - bis - (6 - dimethylamino - 4 - quinaldyl) - 1,4-cyclohexanediamine.

N,N' - bis - (6 - dimethylamino - 4 - quinaldyl) - p-phenylenediamine.

N,N' - bis - (6 - dimethylamino - 4 - quinaldyl) - diaminopropanol-2.

EXAMPLE VIII

*N,N'-Bis-(6-Amino-4-Quinaldyl)-1,6-Hexanediamine Dimethochloride*

A mixture of 2.2 g. of N,N'-bis-(6-acetamido-4-quinaldyl)-1,6-hexanediamine and 1 ml. of dimethylsulfate is refluxed in toluene to obtain 2.0 g. of the quaternized dimethosulfate salt of said base. This is hydrolyzed by boiling 0.5 hour with 1:1 concentrated hydrochloric acid-water. The solid is filtered, dissolved in 75 ml. warm water and made just basic with concentrated ammonium hydroxide. Yield 1.5 g. of N,N'-bis-(6-amino-4-quinaldyl)-1,6-hexanediamine dimethochloride.

Analysis calculated for $C_{28}H_{38}N_6Cl_2 \cdot 2H_2O$: C, 59.32; H, 7.49; N, 14.86; Cl, 12.54; O, 5.66. Found: C, 59.65; H, 7.48; N, 15.24; Cl, 12.19; O, 6.02.

In like manner the 1,1'-bis-dimethochloride quaternary salts of the following bases are obtained:

N,N'-bis-(6-amino-4-quinaldy)-1,3-diaminopropane.
N,N'-bis-(6-amino-4-quinaldyl)-1,3-diaminopropanol-2.
N,N'-bis-(6-amino-4-quinaldyl)-octamethylenediamine.
N,N'-bis-(6-amino-4-quinaldyl)-p-phenylenediamine.
N,N'-bis-(6-amino - 4 - quinaldyl)-heptamethylenediamine.
N,N'-bis-(6-amino-4-quinaldyl)-hexamethylenediamine.
N,N'-bis-(6-amino - 4 - quinaldyl) - nonamethylenediamine.
N,N'-bis-(6-amino-4-quinaldyl)-decamethylenediamine.
N,N'-bis-(6-amino - 4 - quinaldyl)-undecamethylenediamine.
N,N'-bis-(6-amino - 4 - quinaldyl)-dodecamethylenediamine.
N,N'-bis-(6-amino-4-quinaldyl)-1-methyl-1,4-butanediamine.
N,N'-bis- (6-amino-4-quinaldyl)-1-methyl-1,3-propanediamine.
N,N'-bis-(6-amino-4-quinaldyl)-ethylenediamine.
N,N'-bis - (6-amino-4-quinaldyl) - 1,4 - cyclohexanediamine.
N,N'-bis-(6-nitro-4-quinaldyl) - 1,6 - hexanediamine dimethosulfate.

EXAMPLE IX

*N,N'-Bis-(6-Hydroxy-4-Quinaldyl)-1,6-Hexanediamine Dimethosulfate*

2.7 g. of N,N'-bis-(6-hydroxy-4-quinaldyl)-1,6-hexanediamine is suspended in 100 ml. of dry toluene and 50 ml. of nitrobenzene. Approximately 60 ml. of toluene is then distilled to remove residual moisture. To the residue, now under reflux, is added 1.2 ml. of dimethyl- sulfate with stirring for one hour. On cooling the mixture is poured into 200 ml. of ether and a few drops of water is added to assist crystallization of the salt. The solid is recrystallized from 175 ml. water to yield 1.1 g. of N,N'-bis-(6-hydroxy-4-quinaldyl) - 1,6-hexanediamine dimethosulfate. Analysis calculated for $C_{28}H_{36}N_4O_6S \cdot 4H_2O$: C, 53.49; H, 7.06; N, 8.91; S, 5.10. Found: C, 53.54; H, 7.22; N, 8.86; S, 5.08.

Nuclear quaternized salts of any of the bases listed above and falling within the scope of this invention are made by the method detailed in Example IX. For example, the following nuclear quaternized salts are made:

N,N'-bis-(8-hydroxy - 4 - quinaldyl)-1,6-hexanediamine dimethiodide. Analysis calculated for $C_{28}H_{36}I_2N_4O_2$: C, 47.07; H, 5.08; N, 7.84. Found: C, 46.75; H, 5.52; N, 7.74.

N,N'-bis-(8-methyl-4-quinaldyl)-1,6-hexanediamine dimethosulfate. Analysis calculated for $C_{32}H_{46}N_4O_8S_2$: C, 56.64; H, 6.83; N, 8.25. Found: C, 56.81; H, 7.31; N, 8.49.

N,N'-bis-(8-methyl-4-quinaldyl)-1,6-hexanediamine dimethiodide. Analysis calculated for $C_{30}H_{40}I_2N_4$: C, 50.71; H, 5.68; N, 7.68. Found: C, 50.67; H, 5.88; N, 8.08.

N,N'-bis-(8-methyl-4-quinaldyl)-1,8-octanediamine dimethiodide. Analysis calculated for $C_{32}H_{44}I_2 \cdot H_2O$: C, 50.80; H, 6.13; N, 7.46. Found: C, 51.13; H, 5.86; N, 7.74.

N,N'-bis-(8-methyl-4-quinaldyl)-1,5-pentanediamine dimethiodide. Analysis calculated for $C_{27}H_{38}I_2N_4$: C, 50.03; H, 5.53; N, 8.09. Found: C, 50.20; H, 5.65; N, 8.13.

N,N'-bis-(5-methyl-4-quinaldyl)-1,6-hexanediamine dimethiodide. Analysis calculated for $C_{30}H_{40}N_4I_2$: C, 50.71; H, 5.68; N, 7.89. Found: C, 50.40; H, 5.88; N, 8.04.

N,N'-bis-(5-hydroxy-8-methyl-4-quinaldyl)-1,6-hexanediamine dimethiodide. Analysis calculated for $C_{30}H_{40}N_4O_2I_2 \cdot 2H_2O$: C, 46.28; H, 5.70; N, 7.20. Found: C, 45.94; H, 5.72; N, 7.25.

N,N'-bis-(7-methyl-8-hydroxy-4-quinaldyl)-1,6-hexanediamine dimethiodide. Analysis calculated for $C_{30}H_{40}N_4O_2I_2 \cdot 2H_2O$: C, 46.28; H, 5.70; N, 7.20. Found: C, 46.08; H, 5.52; N, 7.37.

N,N'-bis-(6-methyl-8-hydroxy-4-quinaldyl)-1,6-hexanediamine dimethiodide. Analysis calculated for $C_{30}H_{40}N_4O_2I_2 \cdot 2H_2O$: C, 46.28; H, 5.70; N, 7.20. Found: C, 46.39; H, 5.57; N, 8.18.

N,N'-bis-(5-methyl-8-hydroxy-4-quinaldyl)-1,6-hexanediamine dimethiodide. Analysis calculated for $C_{30}H_{40}N_4O_2I_2 \cdot 2H_2O$: C, 46.28; H, 5.70; N, 7.20. Found: C, 45.48; H, 5.68; N, 8.81.

N,N'-bis-(6-methyl-4-quinaldyl)-1,6-hexanediamine dimethosulfate. Analysis calculated for $C_{32}H_{48}N_4S_2O_9 \cdot H_2O$: C, 55.06; H, 6.91; N, 8.04. Found: C, 55.60; H, 6.97; N, 7.77.

N,N'-bis-(8-hydroxy - 4 - quinaldyl)-1,6-hexanediamine dimethiodide. Analysis calculated for $C_{28}H_{36}N_4O_2I_2$: C, 47.07; H, 5.08; N, 7.84. Found: C, 46.75; H, 5.52; N, 7.74.

This application is a continuation-in-part of applications Serial No. 643,507 and Serial No. 643,508 (both now abandoned) both filed March 4, 1957 as continuations-in-part of application Serial No. 579,742, filed April 23, 1956 (now abandoned), and of application Serial No. 471,518, filed November 26, 1954 (now abandoned), both of which were continuations-in-part of application Serial No. 364,467, filed June 26, 1953, now abandoned.

Others may practice the invention in any of the numerous ways which will be suggested to one skilled in the art. It is contemplated that all such practice will be covered by the invention provided it falls within the scope of the appended claims.

I claim:
1. A compound selected from the group consisting of bases which have the formula:

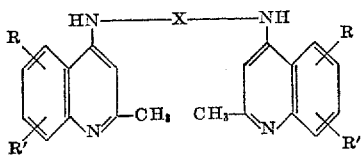

wherein X is selected from the group consisting of an alkylene group having from 2 to 12 carbon atoms inclusive, phenyl, cyclohexyl and —$CH_2$—CHOH—$CH_2$—; R is selected from the group consisting of hydroxyl, loweralkyl, —N—$(CH_3)_2$, —$NH_2$ and —$NHCOCH_3$; and R' is selected from the group consisting of hydrogen and loweralkyl; the pharmaceutically acceptable acid addition salts of said bases and the pharmaceutically acceptable quaternary ammonium salts of said bases which have the formula:

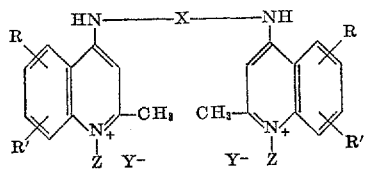

where X, R and R' are as previously defined, Z is loweralkyl and Y is a non-toxic anion.

2. A compound having the formula:

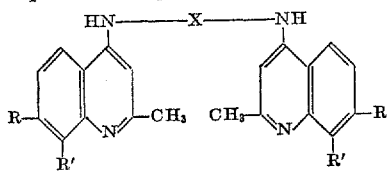

where X is an alkylene grouping having from 2–12 carbon atoms exclusive and R and R' are lower alkyl.

3. A compound having the formula:

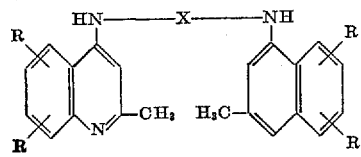

where X is an alkylene grouping having from 2 to 12 carbon atoms inclusive and R is loweralkyl.

4. A base having the formula

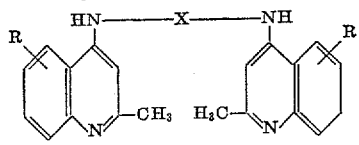

where X is an alkylene group having from 2 to 12 carbon atoms inclusive, and R is —$NH_2$.

5. N,N'-bis-(8-methyl-4-quinaldyl)-1,6-hexanediamine dimethiodide.
6. N,N'-bis-(5,8-dimethyl-4-quinaldyl)-1,6-hexanediamine dimethiodide.
7. N,N'-bis-(5,7-dimethyl-4-quinaldyl)-1,6-hexanediamine dimethiodide.
8. N,N'-bis-(6,8-dimethyl-4-quinaldyl)-1,6-hexanediamine dihydrochloride.
9. N,N'-bis-(8-hydroxy-4-quinaldyl)-1,6-hexanediamine dimethiodide.
10. A compound having the formula

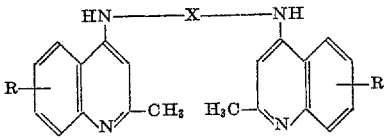

where X is an alkylene group having from 2 to 12 carbon atoms inclusive, and R is —$NHCOCH_3$.

11. N,N'-bis-(6-amino-4-quinaldyl)-hexamethylene-diamine dihydrochloride.
12. N,N'-bis-(6-amino-4-quinaldyl)-hexamethylene-diamine.
13. N,N'-bis-(6-amino-4-quinaldyl)-1,6-hexamethylenediamine dimethochloride.
14. N,N'bis-(6-dimethylamino-4-quinaldyl)-1,6-hexamethylenediamine dimethiodide.
15. N,N'-bis-(6-amino-4-quinaldyl)-1,4-cyclohexanediamine dimethochloride.

References Cited in the file of this patent

UNITED STATES PATENTS

| | | |
|---|---|---|
| 2,050,971 | Jensch | Aug. 11, 1936 |
| 2,474,820 | Burckhalter et al. | July 5, 1949 |
| 2,816,893 | Jacob | Dec. 17, 1957 |
| 2,901,484 | Schock | Aug. 25, 1959 |

FOREIGN PATENTS

| | | |
|---|---|---|
| 760,169 | Great Britain | Oct. 31, 1956 |
| 331,052 | Switzerland | Aug. 15, 1958 |